(12) United States Patent
Fechner et al.

(10) Patent No.: US 11,247,238 B2
(45) Date of Patent: Feb. 15, 2022

(54) SEPARATING AND RECOVERING SILICATE PARTICLES FROM PLANT MATERIAL

(71) Applicant: SIEMPELKAMP MASCHINEN-UND AN-LAGENBAU GMBH, Krefeld (DE)

(72) Inventors: Hans W. Fechner, Duesseldorf (DE); Michael Schoeler, Rheurdt (DE); Jochem Berns, Grefrath (DE); Rolf Trummmel, Duesseldorf (DE)

(73) Assignee: SIEMPELKAMP MASCHINEN-UND ANLAGENBAU GMBH, Krefeld (DE)

( * ) Notice: Subject to any disclaimer, the term of this patent is extended or adjusted under 35 U.S.C. 154(b) by 23 days.

(21) Appl. No.: 16/636,867

(22) PCT Filed: Aug. 9, 2018

(86) PCT No.: PCT/EP2018/071685
§ 371 (c)(1),
(2) Date: Feb. 5, 2020

(87) PCT Pub. No.: WO2019/042737
PCT Pub. Date: Mar. 7, 2019

(65) Prior Publication Data
US 2020/0368782 A1 Nov. 26, 2020

(30) Foreign Application Priority Data
Aug. 31, 2017 (DE) .......................... 102017120033.9

(51) Int. Cl.
*B27N 1/00* (2006.01)
*C01B 33/20* (2006.01)
(Continued)

(52) U.S. Cl.
CPC .................. *B07B 4/02* (2013.01); *B07B 9/02* (2013.01); *B07B 11/02* (2013.01); *B07B 11/06* (2013.01)

(58) Field of Classification Search
CPC .. B07B 4/02; B07B 9/02; B07B 11/02; B07B 11/06
(Continued)

(56) References Cited

U.S. PATENT DOCUMENTS 247,694 A * 9/1881 Schultz .................... B07B 4/02
209/139.1
2,222,861 A 11/1940 Stoner
(Continued)

FOREIGN PATENT DOCUMENTS

DE 1134941 A 8/1962
DE 102015120653 A 6/2017
(Continued)

OTHER PUBLICATIONS

Gobron; Pierre, "Prodn. of Fuel Pellets and Compost from Household Rubbish—Using Sizing Screws to Eliminate Chlorine Producing Materials from Fuel" (English Translation), Jan. 29, 1982, worldwide.espacenet.com (Year: 1982).*

*Primary Examiner* — Charles A Fox
*Assistant Examiner* — Molly K Devine
(74) *Attorney, Agent, or Firm* — Andrew Wilford (57) ABSTRACT

The invention relates to a device and a method for separating and/or recovering silicate particles from plant material. This device and the method are characterized by an air classifier (3, 14), which has at least one material inlet (4), an air inlet (6), arranged under the material inlet (4), an air outlet (7) and at least one particle receptacle (8), arranged under the air outlet, wherein the plant particles recovered from plant material by crushing can be subjected to an air stream in the
(Continued)

air classifier (3, 14) in such a way that silicate particles contained in the plant material are removed by the air stream via the air outlet (7) and, as a result of gravitational force, the plant particles are received by the particle receptacle (8) arranged under the air outlet (7) and taken away.

13 Claims, 4 Drawing Sheets

(51) Int. Cl.
  *B07B 4/02* (2006.01)
  *B07B 9/02* (2006.01)
  *B07B 11/02* (2006.01)
  *B07B 11/06* (2006.01)
(58) Field of Classification Search
  USPC .......................................................... 209/133
  See application file for complete search history.

(56) References Cited

U.S. PATENT DOCUMENTS

| | | |
|---|---|---|
| 2010/0163463 A1 | 7/2010 | Dal Ben |
| 2012/0123022 A1 | 5/2012 | Berns |
| 2015/0368039 A1* | 12/2015 | Cochrum ............... B65D 88/32 |
| | | 406/75 |

FOREIGN PATENT DOCUMENTS

| | | | |
|---|---|---|---|
| EP | 1331045 A | 7/2003 | |
| FR | 2102604 B | 4/1972 | |
| FR | 2487221 A1 * | 1/1982 | ............... B03B 9/06 |
| KR | 101048410 A | 7/2011 | |
| WO | 2011014137 A | 2/2011 | |

* cited by examiner

SEPARATING AND RECOVERING SILICATE PARTICLES FROM PLANT MATERIAL

CROSS REFERENCE TO RELATED APPLICATIONS

This application is the US-national stage of PCT application PCT/EP2018/071685 filed 9 Aug. 2018 and claiming the priority of German patent application 102017120033.9 itself filed 31 Aug. 2017.

FIELD OF THE INVENTION

The invention relates to an apparatus for separating and/or extracting silicate particles from plant material.

BACKGROUND OF THE INVENTION

The plant material or starting material here is a lignocellulosic starting material such as wood, especially preferably so-called annual plants. Annual plants are plants that require only one growing season from germination of the seed to the development of the entire plant, flowering, fertilization, and maturation of the new seed. Examples of such fast-growing plants are cereals (or the straw produced by them) such as rice or rice straw, but also bamboo, as well as bagasse, reed, or giant reed.

In agricultural cultivation, for example cereal or rice cultivation, straw usually arises as a leftover that is either left in the fields or burned. In addition, it has been proposed to use straw, such as rice straw, for example, for the manufacturing of fiberboard (see DE 10 2009 057 916 [US 2012/0123022] and DE 10 2015 120 653). When annual plants are used for board manufacturing in this manner, suitable scatterable particles (chips or fibers) are first produced using comminutors and glued. These glued particles are then scattered by one or more spreaders onto a scattering belt conveyor, for example, to form a strewed-material mat and fed to a press, the strewed-material mat being pressed in the press under application of pressure and heat to form a board. In principle, the use of annual plants, for example straw left over therefrom, represents a promising alternative to the use of wood for making fiberboard or chipboard. One problem in connection with the processing of particles from annual plants, for example rice straw, is the fact that annual plants store high amounts of silicate during their growth that is introduced into the production process and can be disruptive, since such mineral silicates can result in high wear in a variety of system components due to their properties. For this reason, it has already been proposed, in DE 10 2009 057 916, for example, that the components of a mixer for the gluing of fibers are wear resistant, since the silicates stress the surfaces of the components intensively.

Apart from that, there are numerous (industrial) uses for silicates, for example as additives in the manufacture of insulation panels, fire panels, or also as abrasives. This is where the invention comes in.

In addition, classifiers for separating material are inherently known from the prior art. For example, US 2010/0163463 describes an apparatus and a method for separating foreign bodies from wood and/or plant particles.

OBJECT OF THE INVENTION

The object of the invention is to provide an apparatus for the separation and/or extraction of silicates from plant material. This apparatus enables problems brought about by silicates during board production to be avoided. Alternatively or in addition, a new and cost-effective possibility for recovering or extracting silicates is to be specified.

SUMMARY OF THE INVENTION

To attain this object, the invention teaches an apparatus for separating and/or extracting silicate particles from plant material that comprises an air classifier having at least one material inlet, one air inlet that is below the material inlet, one air outlet, and at least one particle receiver that is below the air outlet, wherein plant particles (including silicates) obtained by comminution in the air classifier can be exposed to an air stream in such a way that (free) silicate particles contained in the plant material are discharged with the air stream via the air outlet and, by force of gravity, the plant particles are received and removed by the particle receiver that is below the air outlet.

According to a first aspect, the invention is based on the discovery that, in the course of the production of fiberboard or chipboard, particularly from annual plants, it is advantageous to separate silicates that have become embedded in the plant during growth from the plant particles, so that plant particles, such as chips or fibers, for example, can be made available that can be processed properly going forward. According to a first aspect of the invention, the apparatus described is thus used to separate the silicates from the plant particles with the aim of further processing the plant particles (freed from silicates), particularly in the course of the manufacturing of chipboard or fiberboard.

In addition, according to a second aspect, the invention has recognized that plants, and annual plants in particular, are outstandingly suitable for the extraction and hence the production of silicates, given that silicates can be separated from the plant particles with the apparatus according to the invention and can thus be otherwise used. In this second aspect of the invention, the focus is therefore on the extraction of the silicate particles from plant material specifically for use in other industrial processes or products.

It will readily be understood that these two aspects can also be combined with one another, so that "silicate-free" plant particles can be obtained for manufacturing chipboards and fiberboard on the one hand and silicate particles can be obtained for further processing on the other hand. Silicate particles preferably refer to those with a diameter of less than 50 µm, preferably up to 20 µm.

The invention recognizes that silicates formed in the plants, particularly annual plants, during growth can be separated in a surprisingly efficient manner using the classifier according to the invention despite its simple construction. In the context of the invention, "silicates" or "silicate particles" thus refer particularly to the silicates/silicate particles that are formed in the plants or fibers or cells thereof during growth and released as a result of comminuting the plants and/or the opening of the fibers. The possibility of the particularly effective separation of such silicates from plant material with the aid of an air classifier is due, among other things, to the fact that the silicates are present in the plant material, for example in straw particles or the like, in a relatively uniform size and shape, particularly in a spherelike shape in the interior of the plant cells with a small diameter of generally less than 50 µm, for example about 5 µm to 20 µm, whereas the plant fiber particles intended for further processing are substantially larger. By virtue of their small and substantially uniform size, the silicate particles are reliably entrained in the air classifier by the air stream that is introduced into the classifier, so that they can be removed with the air stream via an air outlet, while the other particles, that is, particularly the larger plant particles, fall down and are collected in a suitable particle receiver and removed. This separation is surprisingly efficient. This is also due to the fact that the silicate particles, because of their very small (and uniform) dimensions, form an aerosol together with the air stream, so that the silicate particles are reliably transported as solid floating particles in the air stream (or another gas flow). The air (or another gas) thus constitutes a vehicle gas for the silicate particles. This principle and the classifier described can be used first of all to separate troublesome silicate particles during a process for making glued plant particles for board production, particularly so that problems with wear in the system components during the manufacture of boards can be avoided and costly measures for improving wear protection in the installations can be dispensed with. In addition, the quality of the boards is substantially improved by reducing silicate content.

On the other hand, the principle described and the classifier described can be used for separating silicate particles from plant material for the purpose of obtaining silicate particles, so that plant material, annual plants, for example, can be used very specifically for the production and hence extraction of silicate particles, it being possible for the silicate particles to be conveyed for further processing after separation. In this aspect of the invention, the use of plant material, for example annual plants, for making silicates or silicate particles is the main focus, with the applications of such silicate particles ranging from use as an additive for making insulation panels and fireproof panels to use thereof as an abrasive. Making silicate particles from plant material is therefore a cost-effective and very attractive alternative to the conventional production and extraction methods.

The primary focus of the invention is on the apparatus described, which is characterized by an air classifier. It is possible for the supply air into the classifier housing using a supply-air fan. In a preferred embodiment, however, air is supplied passively by connecting an exhaust fan to the air outlet. It makes it easily possible for air, for example ambient air, to be sucked into the classifier housing via the air inlet, in which case the air inlet can be preferably provided in a suitable manner with protective measures such as a protective screen and/or a rain ambient air Alternatively, there is also the possibility of recirculating the air and thus returning the extracted air (after appropriate separation of the silicates from the air/silicate mixture) to the air inlet.

The classifier can separate into two fractions (plant particles, silicate particles). In addition to the particle receiver, a coarse-material receiver can optionally also be provided that is likewise below the air outlet and upstream from the particle receiver in the direction of flow. Large and heavy foreign bodies such as stones that get into the classifier with the plant particles can be separated in this way and removed via the coarse-material receiver, so that separation into three fractions is performed in this embodiment (coarse material/stones, plant particles, silicate particles).

It is optionally possible for not only a single particle receiver to be provided, but rather a plurality of particle receivers that are in series (in the direction of flow) or a particle receiver with a plurality of receiving zones that are in a row one after the other can also be provided. This configuration has the advantage that it is optionally possible to separate (the plant particles) into multiple (useful) fractions. In an advantageous development, the location and/or length (along the direction of flow) of one or more particle receivers or receiving zones are (variably) set, specifically during assembly and/or placement into operation and/or during operation. This can be achieved by adjustable baffle plates between the particle receivers.

In a preferred development, the apparatus comprises at least one comminutor for comminuting plant starting material into scatterable plant particles, which are fed to the air classifier. After all, it is of particular importance that the cells of the plant material be broken open during comminution of the plant material in which the silicate particles are embedded, so that the silicate can be released and separated in the manner described. Such a comminutor can work in a purely mechanical manner, for example as a hammer mill, optionally with an upstream straw chopper. The mechanical comminution of the material breaks open the silicate chambers and plant cells to a high degree, so that separation of the silicates can then be performed.

In an especially preferred development, separation of the silicate can be performed in two stages. This means that a first comminutor, a first classifier (i.e. a first air classifier), a second comminutor, and a second classifier (i.e. a second air classifier) are provided. The plant particles obtained in the first classifier and that have already been largely freed of silicates are fed to the second comminutor, in which the plant particles are comminuted again or further, so that more silicates are released that are then separated again in the second classifier. In this case, the second comminutor can be a fiberizer or a fiberizing system for converting plant particles into plant fibers. Such fiberizing systems are known, for example, from MDF board production. They particularly have a refiner in which the chip-like particles are broken down into fibers in an inherently known manner. In the course of this fiberizing, the wood cells or plant cells in which the silicate particles are embedded are further or completely broken open, so that silicates are released in this second stage (which are then separated in the second classifier). It is interesting to note that the first classifier and the second classifier can be adapted to the respective circumstances in terms of dimensioning and flow characteristics and, in particular, the particle characteristics, thus making particularly efficient silicate separation and hence also silicate extraction possible in two stages. Such a two-stage procedure is also especially advantageous in the production of vegetable fibers for making fiberboard, for example MDF boards. However, the two-stage separation of silicate particles can also be useful in the production of straw chips or the like for making chipboard if no fiberization is performed in a refiner or the like. Multistage comminution is also expedient for making chips, so that the second comminutor can then be embodied as a suitable mill, thus enabling the second comminution to be a grinding process.

In principle, the second classifier that is preferably provided can have the same design as the described first classifier. Optionally, it may be expedient to provide separation into three fractions (including the removal of foreign bodies) in the first classifier and for a separation into only two fractions to be performed in the second classifier, so that an additional coarse-material receiver in the form of a "stone trap," for example, can be dispensed with there.

The first and/or second classifier, which preferably operate as air-classification devices, has a housing that, in one very simple embodiment, can be a box, for example. Such a box-shaped housing can be embodied a parallepiped or the like, in which case at least the material inlet and the air inlet preferably extend over (substantially) a full width of the housing. The material inlet can, for example, be integrated into the (upper wall) ceiling of the box-shaped housing, particularly relative to the direction of flow in the upstream region of the ceiling, so that the material falls from above into the box-shaped housing. In one very simple embodiment, the air inlet can be integrated into the upstream wall of the housing, for example into the upper region of the front wall. The air outlet can, for example, be integrated into the rear wall opposite the front wall or be at the rear wall, particularly also in the upper region of this rear wall, for example. This means that the air stream with the silicate particles essentially flows an upper part of the housing while the plant particles and any stones or similar coarse materials fall out of the air stream. The particle receiver and/or the coarse-material receiver is consequently on the floor of the box-shaped housing, so that the plant particles and/or the coarse materials are received in the lower region of the box-shaped housing. From there, they can be discharged downward or laterally out of the housing. For the purpose of breaking up the material to be introduced, rollers, such as opening rollers, for example, can also be integrated into the material inlet, which can be formed as a chute, for example, or connected to a chute. The division of the material can thus take place at the inlet, so that a plurality of "curtains" of particles are created. It is also possible to provide feed devices such as feed screws, for example, at the material inlet. A discharge device can be integrated into the particle receiver in the lower region of the housing, for example, or a discharge device can be connected to this particle receiver and have for example one or more discharge screws. Alternatively, other discharge devices such as conveyor belts or the like can also be considered, but discharge screws have the advantage that they are substantially (gas-)tight, so that additional cell-wheel sluices or the like can be dispensed with. A cell-wheel sluice can be also be optionally provided in order to make the chamber floor of the classifier gas-tight.

A classifier whose (box-shaped) housing is composed of one or more ISO freight containers is characterized by an especially simple construction and particularly economical transport. For instance, the housing can be composed of multiple, for example two or three stacked standard containers, these being preferably 40-foot standard containers, which can also be embodied as high-cube containers, for example. In this case, the width and length of the classifier housing are defined by the width and length of the standard containers. The invention proceeds in this regard from the surprising discovery that, in spite of such a simple construction, silicate particles can be separated economically from the particle stream with a high level of efficiency. When formed by freight containers, the housing can be transported modularly to the deployment site and assembled there.

The housing or the containers can then be (subsequently) equipped with conventional maintenance platforms or the like that are set up on and/or attached for example to the outside of the containers.

In principle, the possibility exists of using the plant particles freed from silicate particles in the manner described for further processing in the course of board production. In that case, they are preferably fed to a gluing device and there coated with a binder and thus glued. Such a gluing apparatus can have an inherently known design. Preferably, a gluing apparatus is used that is embodied as a drum mixer such as that described in DE 10 2009 057 916. The plant particles, for example chips or fibers, that are glued using a gluing device can be further processed in a process that is inherently known and fed, for example, to a spreader in order to produce a strewed-material mat from the glued plant particles and then fed to a press that is downstream from the spreader in which the strewed-material mat is pressed into a board under application of pressure and/or heat. The classifier according to the invention can thus be integrated into an overall installation for manufacturing boards. The press can be a cycle press, for example a single- or multi-platen press. In addition, it can alternatively be a continuously operating press that is embodied as a dual-belt press, for example.

As already described, the invention is also based on the discovery that the separated silicate particles in particular are utilized. The invention therefore also includes such embodiments in which the primary focus is on the separation or extraction of silicate from plant material without the necessity of conveying the plant particles to another process or another use.

The object of the invention is also a method for separating and/or extracting silicate particles from plant material, particularly with an apparatus of the type described. This method is characterized in that plant particles are produced by comminution from plant starting material, particularly from annual plants, and silicate particles are released from the starting material in such a way that the comminuted plant particles (including the released silicate particles) are impinged by an air stream in an air classifier, that the (released) silicate particles are discharged with the air stream via an air outlet of the air classifier, and that the plant particles are collected by force of gravity by a particle receiver that is below the air outlet and removed as appropriate. The silicate particles that are discharged via the air outlet are then preferably separated from the air stream, for example by a cyclone or a suitable separator, and conveyed to a collector where they are available for further processing. According to another aspect of the invention, the provision of the separated silicate particles for further processing is likewise the primary focus.

The plant starting material is constituted by annual plants or parts of such annual plants, such as straw that remains after a plant is threshed. According to the invention, this straw can be used with particular effectiveness on the one hand in the manufacturing of fiberboard or chipboard, specifically because of the described separation of the silicate components and the avoidance of the problems previously observed when processing such materials. On the other hand, an effective extraction of silicate particles from such plant material, such as straw, for example, can be performed.

BRIEF DESCRIPTION OF THE DRAWING

The invention will be explained in greater detail in the following with reference to a drawing that illustrates embodiments. Therein.

SPECIFIC DESCRIPTION OF THE INVENTION

Figure 1:
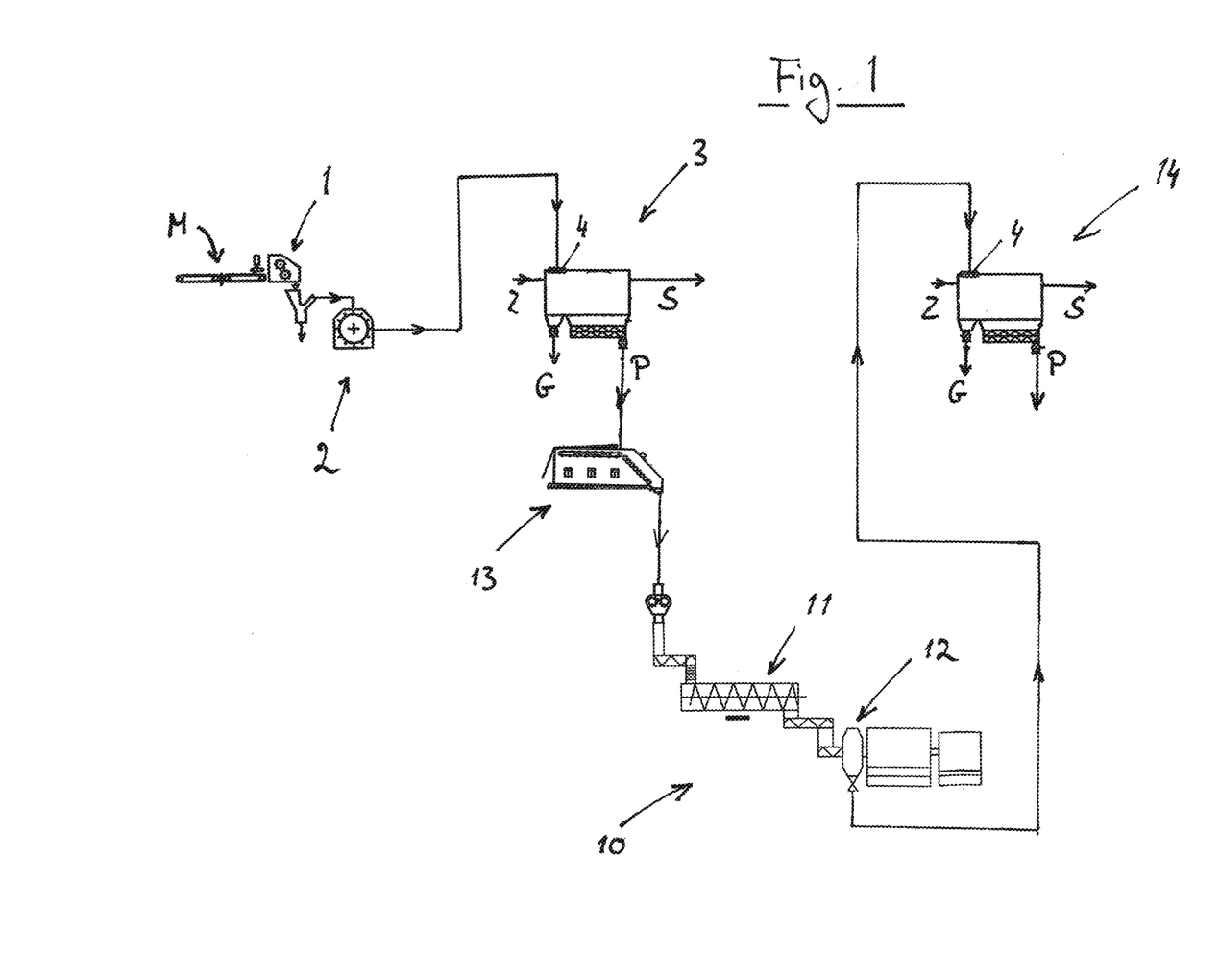
FIG. 1 is a highly simplified schematic representation of an apparatus for separating and/or extracting silicate particles from plant material.

FIG. 1 shows an apparatus (or installation) with which silicate particles can be separated from plant material. After precomminution in a straw chopper 1, for example, straw that is provided as the starting material M is comminuted in a first comminutor 2, here a hammer mill 2 in this embodiment. The material produced in this first comminutor 2 is fed to a first classifier 3 forming a first classifying stage for separating silicate particles from the straw particles.

This first classifier 3, which will be discussed in greater detail below, is shown in enlarged view in FIGS. 2 to 5.

In such a classifier 3, which here is an air classifier, the straw particles are introduced into a classifier housing 5 via an upper material inlet 4 and an air stream (supply air Z) is applied to the classifier housing. For this purpose, the classifier 3 has an upstream upper air inlet 6 and a downstream upper air outlet 7. A particle receiver 8 is provided for the straw particles P that are freed of silicate S is provided beneath the air outlet 7. In this embodiment, a coarse-material receiver 9 for receiving foreign bodies, for example stones or similar coarse material G, is upstream from the particle receiver 8 in the direction of flow. In this classifier, the (released) silicate particles S are entrained by the air stream due to their very small and uniform size and discharged via the air outlet 7, while the plant particles, for example straw particles P, travel toward the particle receiver 8 and are removed from there, for example by screws 29.

In this illustrated embodiment, the straw particles that are freed of silicate in the first classifying stage are optionally fed to a second comminutor 10 in an additional step after being temporarily stored in a bin 13. In this embodiment, this second comminutor 10 can be embodied as a fiberizer in which straw fibers are produced from the straw particles, it being possible in principle for such straw fibers to be used for making fiberboard. The fiberizer 10 can, in an inherently known manner, have a digester 11 in which the particles are softened with high-pressure steam for example. This can be followed in an inherently known manner by a refiner 12 in which the softened particles are ground up. The fibers that are ground up in this manner can now (after drying) be fed to the second classifier 14 where another separation of (released) silicate particles from the straw particles or the straw fibers now produced is carried out.

The second classifier 14, which is merely suggested in FIG. 1, is again embodied as an air classifier. It is basically constructed the same and functions the same as the first classifier 3 described above, it being optionally possible to dispense with the coarse-material receiver or stone trap in the second classifier. In any case, silicate particles S are again discharged via an air outlet 7 in this second classifying stage and optionally collected. The straw fibers P that have been freed of silicate S are in turn discharged via the particle receiver 8 and removed and collected as appropriate.

In this embodiment, the classifier 3 or 14 has a box-shaped housing 5 with the material inlet 4, the air inlet 6, the air outlet 7, as well as the particle receiver 8 and the coarse-material receiver 9, as described above. An upper chute 16 provided with rollers, for example sealing rollers 17, is connected to the material inlet 4. Moreover, feed screws 18 are shown that feed the material to the material inlet 4. The material inlet 4 extends substantially over the full width of the classifier housing 5 and is integrated into the upper wall of the classifier housing in this embodiment shown, so that the material falls into the classifier housing from above. The air inlet 6 is integrated into the upper region of the upstream front wall of the classifier housing. This air inlet 6 can also extend over the full width of the classifier housing 5. The air outlet 7, which also extends over the full width of the classifier housing, is at the downstream rear wall of the classifier housing and then merges into one or more outlet conduits 27 with a reduced diameter, the disruptive silicate particles S being discharged with the air stream via this conduit or conduits 27. The silicate particles S can then be separated from the air stream using a suitable separator, for example a cyclone. Details are not shown. In this embodiment, discharge screws 29 are provided at the lower particle receiver 8.

It is possible in principle for the plant particles, for example plant fibers that have been freed of silicate, to be used in the manufacture of panels, such as fiberboard. In this case, the possibility exists of feeding the particles to a spreader, for example, with which a strewed-material mat is then produced and pressed into a board under application of pressure and heat. Details are not shown in the figures.

Alternatively or in addition, however, the extraction of silicate particles S can also be the primary focus. In this case, the silicate particles that are separated in the first classifier 3 and/or second classifier 14 are collected and optionally stored in an unillustrated bin for example, so that they can be made available for further processing, for example in the course of the manufacture of fireproof panels or as an insert for abrasives or the like.

FIG. 1 shows a two-stage process. To the same extent, however, the invention also encompasses a single-stage process or a single-stage system with only one classifier, it also being possible, of course, for a plurality of classifiers to be connected in parallel in such a single-stage process.

Figure 5:
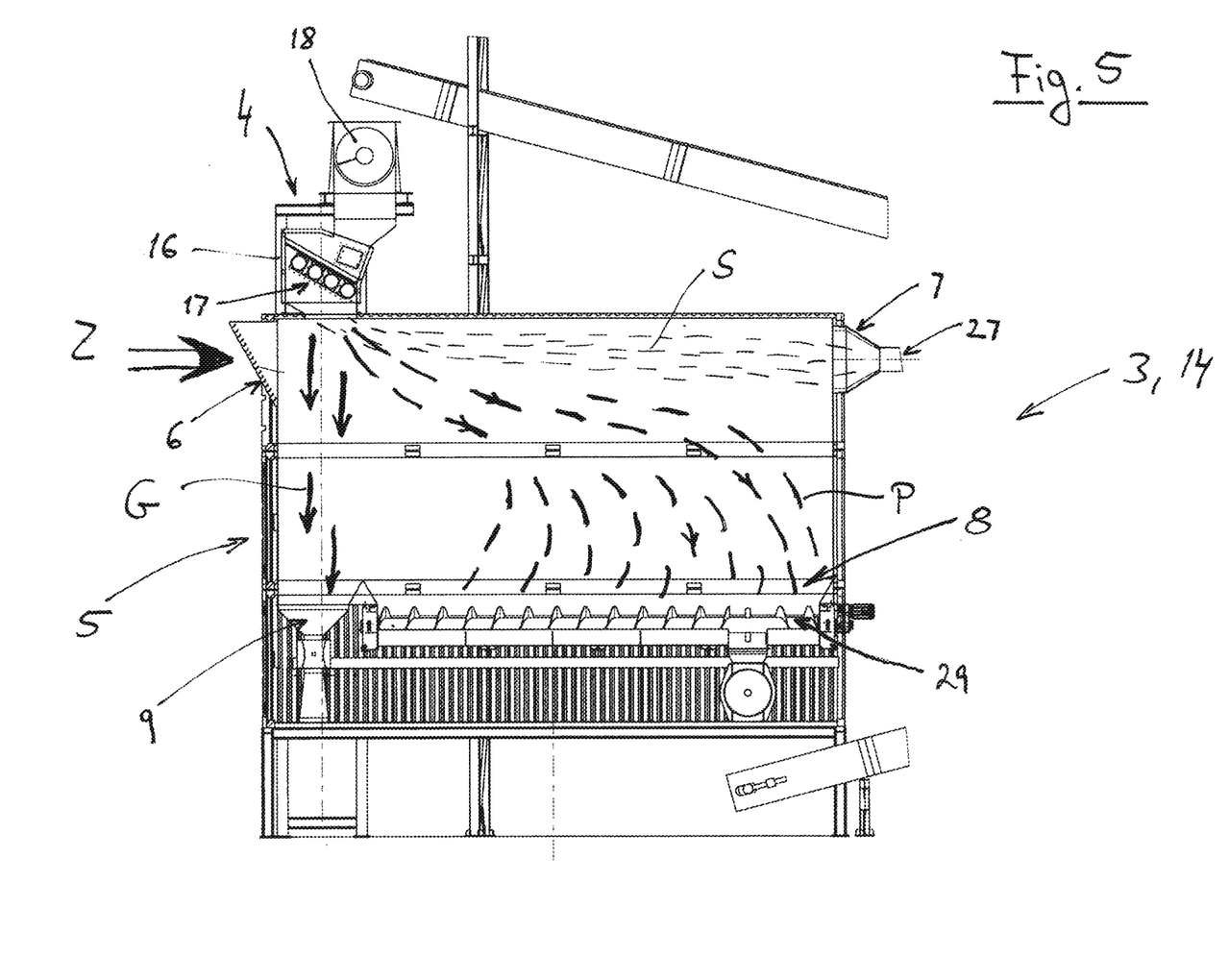
FIG. 5 is a section A through the object according to FIG. 3 with flow conditions indicated.

FIG. 5 shows the flow conditions in the classifier. It can be seen that, due to their small dimensions, the (freed) silicate particles S are discharged as an aerosol with the air stream via the upper air outlet 7 and one or more exhaust ducts 27, while the straw particles P fall down due to gravity and into the particle receiver 8. Coarse material G, such as stones, for example, falls immediately after entering the housing 5 into the coarse-material receiver 9, which is also referred to as a "stone trap."

The flow within the classifier is achieved in this embodiment by a suction device, meaning that exhaust fans are connected to the air outlet, with the effect that the air stream Z is supplied passively via the air inlet 6. Fresh air can be supplied here. Alternatively, however, the fresh air stream can also be recycled.

Figure 2:
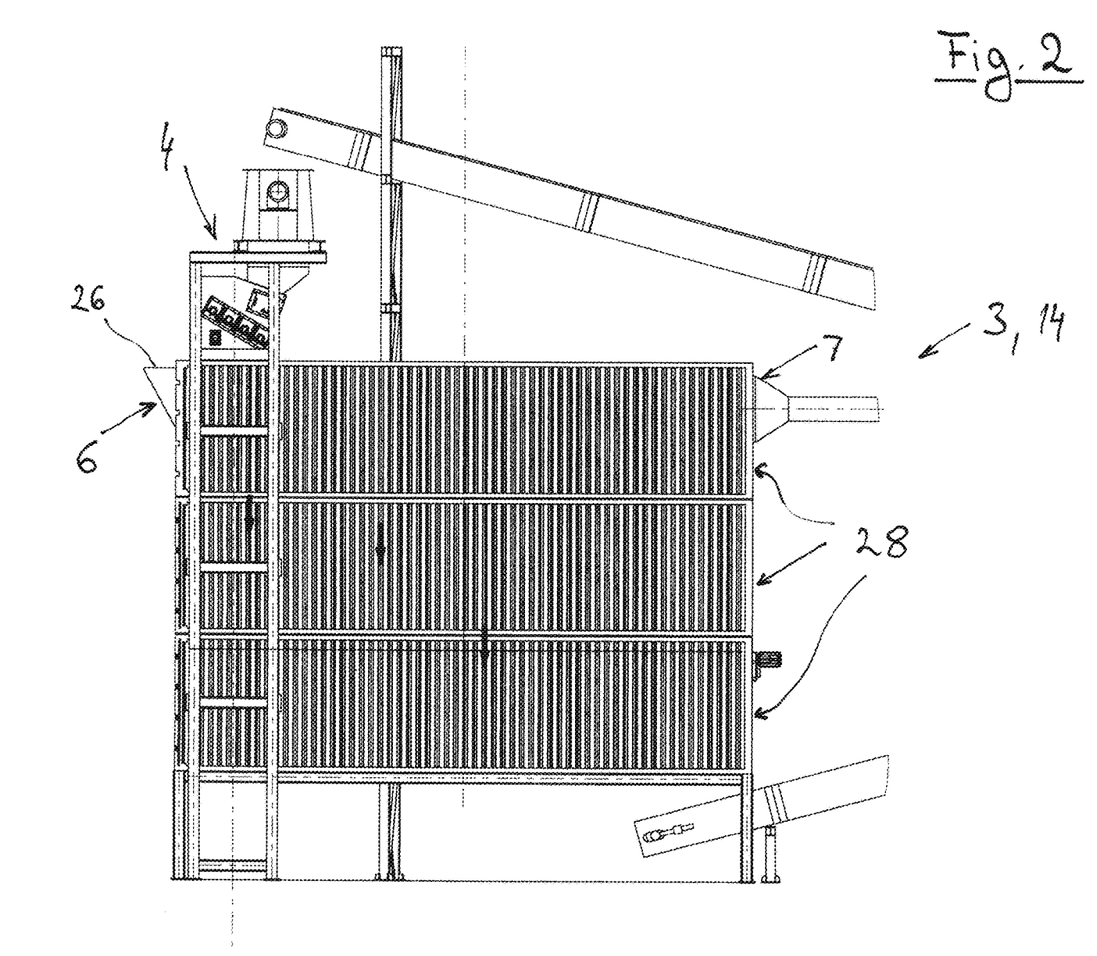
FIG. 2 is a side view of an air classifier of the apparatus as in FIG. 1.
Figures 3, 4:
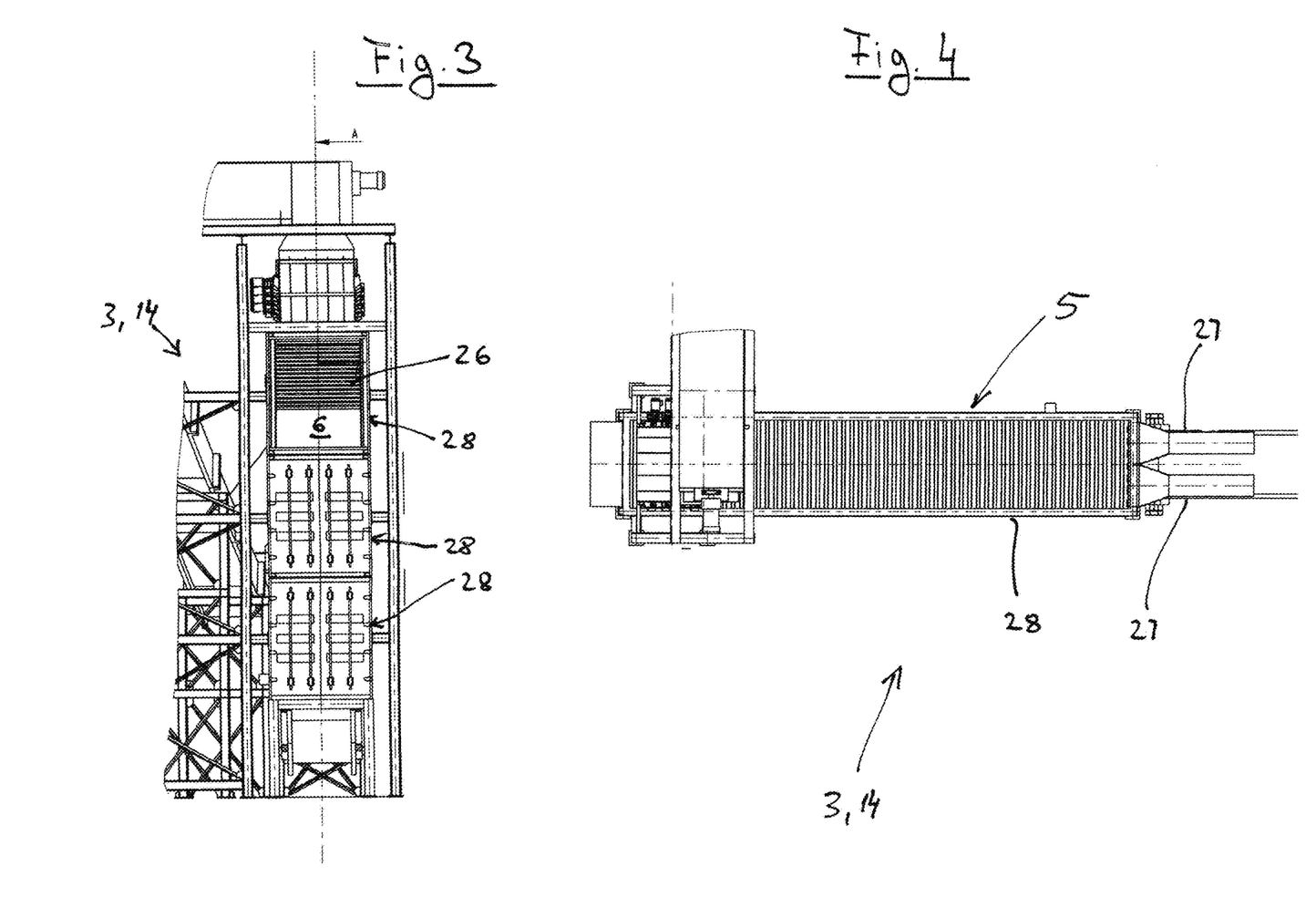
FIG. 3 is a front view of the air classifier according to FIG. 2.
FIG. 4 is a top view of the object according to FIG. 2.

Moreover, it can be seen in FIGS. 2 to 4 that the classifier housing in the illustrated embodiment is produced in a very simple manner from multiple ISO freight containers, specifically from three standard containers 28 that are stacked one above the other, each with a length of 40 ft. Such a construction has the great advantage that the individual components can be easily transported.

The air inlet 6 can be created very simply by opening the container doors. A screen or the like can be integrated into the inlet to prevent entry of foreign bodies. In addition, a rain cover 26 can be above the inlet.

The invention claimed is:

1. A method of separating and/or extracting silicate particles from plant material in an apparatus having a first air classifier with a material inlet, an air inlet below the material inlet, an air outlet, and at least one particle receiver below the air outlet, the method comprising the steps of:
    producing plant particles by comminution from plant starting material and thereby freeing silicate particles from the starting material,
    feeding the comminuted plant particles and silicate particles to the material inlet into the first air classifier,
    flowing an air stream through the air inlet, across the first air classifier and through the particles therein above the particle receiver, and then out the air outlet such that the silicate particles contained in the plant material are discharged with the air stream via the air outlet and, by force of gravity, the plant particles drop into the particle receiver, discharging the silicate particles with the air stream via the air outlet of the air classifier, and removing the plant particles from the particle receiver below the air outlet.

2. The method according to claim 1, further comprising the step of:

intercepting foreign bodies upstream of the particle receiver in the first air classifier in the direction of flow.

3. The method according to claim 1, wherein the air classifier has a box-shaped housing, and the material inlet, the air inlet, and the air outlet extend over a full width of the housing such that the air stream flows across a full width of the housing.

4. The method according to claim 3, wherein the material inlet is integrated into an upper wall of the housing, the air inlet is integrated into a front wall of the housing, and the air outlet is integrated into a rear wall of the housing that is opposite the front wall of the box-shaped housing.

5. The method according to claim 3, wherein the box-shaped housing is formed by multiple standard freight containers stacked one above the other.

6. The method according to claim 1, wherein the particles are fed into the material inlet by a plurality of rollers provided in the material inlet or in a chute connected thereto, the particles being removed from the receiver by a discharge device integrated into or connected to the particle receiver and that has one or more discharge screws.

7. The method according to claim 1, further comprising:

comminuting the particles with a second comminutor downstream from the first classifier; and classifying the particles with a second classifier downstream from the second comminutor.

8. The method according to claim 1, further comprising the step of:

separating the silicate particles discharged via the air outlet from the air stream and storing the separated silicate particles.

9. The method according to claim 1 wherein the silicate particles are respectively separated from the particle stream in two stages, one after a first comminution and another after a second comminution.

10. The method according to claim 1, wherein the silicate particles have a diameter of less than 50 µm.

11. The method according to claim 1, wherein the silicate particles have a diameter of less than 20 µm.

12. The method according to claim 1, wherein the silicate particles have a diameter between 5 µm and 20 µm.

13. A method of separating and/or extracting silicate particles from plant material, the method comprising the steps of:

producing plant particles by comminution from plant starting material and thereby freeing silicate particles from the starting material;

introducing the comminuted particles into an air classifier;

flowing an air stream in the classifier through the particles such that silicate particles contained in the plant material are entrained by the air stream and, by force of gravity, the plant particles drop into a particle receiver, removing the silicate particles with the air stream from an outlet of the classifier, and removing the plant particles from the particle receiver.

* * * * *